US009915464B2

(12) United States Patent
Tae et al.

(10) Patent No.: US 9,915,464 B2
(45) Date of Patent: Mar. 13, 2018

(54) REFRIGERATOR

(71) Applicant: LG ELECTRONICS INC., Seoul (KR)

(72) Inventors: Dongbeen Tae, Seoul (KR); Kyunghoon Koak, Seoul (KR); Siyeon An, Seoul (KR)

(73) Assignee: LG Electronics Inc., Seoul (KR)

( * ) Notice: Subject to any disclaimer, the term of this patent is extended or adjusted under 35 U.S.C. 154(b) by 79 days.

(21) Appl. No.: 14/580,336

(22) Filed: Dec. 23, 2014

(65) Prior Publication Data

US 2015/0225225 A1 Aug. 13, 2015

(30) Foreign Application Priority Data

Feb. 11, 2014 (KR) ........................ 10-2014-0015278

(51) Int. Cl.
*B67D 1/08* (2006.01)
*F25D 23/02* (2006.01)
(Continued)

(52) U.S. Cl.
CPC ......... *F25D 23/028* (2013.01); *B67D 1/0014* (2013.01); *B67D 1/0857* (2013.01);
(Continued)

(58) Field of Classification Search
CPC .. B67D 1/0009; B67D 1/0014; B67D 1/0857; B67D 1/0889; F25D 23/126;
(Continued)

(56) References Cited

U.S. PATENT DOCUMENTS 1,848,848 A 3/1932 Sloan
4,742,691 A * 5/1988 Kennedy ............... F24F 3/1405 62/150
(Continued)

FOREIGN PATENT DOCUMENTS

CN 1781008 5/2006
CN 1862186 11/2006
(Continued)

OTHER PUBLICATIONS

European Search Report dated Jun. 12, 2015 from corresponding European Patent Application No. 14198778.4, 6 pages (in English).
(Continued)

*Primary Examiner* — Christopher R Zerphey
(74) *Attorney, Agent, or Firm* — Fish & Richardson P.C.

(57) ABSTRACT

A refrigerator includes a main body having a refrigerating compartment and a freezing compartment, a door for opening or closing the refrigerating compartment or the freezing compartment, a filter unit disposed within the refrigerating compartment for purifying water supplied from a water supply source outside the main body, water tank for receiving the purified water from the filter unit and to cool the received water by using cool air within the refrigerating compartment, and a dispenser disposed in the door to dispense the cooled water stored in the tube tank assembly. The tube tank assembly includes a tube defining a cold water passage that can allow the cooled water to flow therethrough, and a tube support around which the tube is wound multiple times.

24 Claims, 14 Drawing Sheets

(51) Int. Cl.

| | |
|---|---|
| ***F25D 23/06*** | (2006.01) |
| ***B67D 1/00*** | (2006.01) |
| ***F25D 23/12*** | (2006.01) |
| ***F25C 5/00*** | (2018.01) |
| ***F25D 11/02*** | (2006.01) |

(52) U.S. Cl.

CPC ......... *B67D 1/0858* (2013.01); *B67D 1/0889* (2013.01); *F25C 5/005* (2013.01); *F25D 11/02* (2013.01); *F25D 23/065* (2013.01); *F25D 23/126* (2013.01); *F25C 2400/10* (2013.01); *F25D 2323/024* (2013.01); *F25D 2323/121* (2013.01)

(58) Field of Classification Search

CPC ......... F25D 2323/121; F25D 2323/122; F28D 1/0333; F28D 1/0472; F28D 7/04; F28F 9/013; F28F 9/0131; F28F 2280/06

See application file for complete search history.

(56) References Cited

U.S. PATENT DOCUMENTS

| | | | | |
|---|---|---|---|---|
| 5,813,245 | A | 9/1998 | Coates et al. | |
| 5,956,967 | A * | 9/1999 | Kim | B67D 1/0009 222/146.6 |
| 6,511,573 | B1 | 1/2003 | Globensky et al. | |
| 8,640,481 | B2 | 2/2014 | An | |
| 2002/0148600 | A1* | 10/2002 | Bosch | F01M 5/00 165/163 |
| 2005/0103721 | A1* | 5/2005 | Fritze | C02F 1/003 210/744 |
| 2005/0268639 | A1* | 12/2005 | Hortin | B67D 1/0009 62/389 |
| 2006/0144066 | A1 | 6/2006 | Lee et al. | |
| 2006/0218961 | A1 | 10/2006 | Kim et al. | |
| 2007/0251261 | A1 | 11/2007 | Son et al. | |
| 2009/0293735 | A1* | 12/2009 | Van Dillen | A47J 31/0668 99/295 |
| 2010/0218510 | A1* | 9/2010 | Kim | A23G 9/045 62/3.1 |
| 2010/0229592 | A1 | 9/2010 | Lim et al. | |
| 2010/0287971 | A1 | 11/2010 | Lee et al. | |
| 2011/0283734 | A1 | 11/2011 | Koo | |
| 2016/0231046 | A1* | 8/2016 | Tae | B67D 1/0889 |

FOREIGN PATENT DOCUMENTS

| | | |
|---|---|---|
| CN | 101231083 | 7/2008 |
| CN | 100414226 | 8/2008 |
| CN | 100464144 | 2/2009 |
| CN | 100533019 | 8/2009 |
| CN | 101769666 | 7/2010 |
| CN | 102455101 | 5/2012 |
| CN | 102455109 | 5/2012 |
| DE | 102006044559 | 4/2007 |
| EP | 1645825 | 4/2006 |
| JP | 2008-076016 | 4/2008 |
| JP | 2009-180498 | 8/2009 |
| JP | 2010-096410 | 4/2010 |
| KR | 10-0246399 | 4/2000 |
| KR | 10-0756884 | 9/2007 |
| KR | 10-0764553 | 10/2007 |
| KR | 10-2011-0046403 | 5/2011 |
| KR | 10-1046185 | 7/2011 |
| WO | WO2012178044 A1 | 12/2012 |

OTHER PUBLICATIONS

Office Action issued in Chinese Application No. 201410782034.0 dated Sep. 5, 2016.

Extended European Search Report in European Application No. 16184707.4-1605, dated Mar. 3, 2017, 5 pages (with English translation).

Office Action issued in Chinese Application No. 201610140391.6 dated Aug. 30, 2017, 11 pages. (with English translation).

Office Action issued in Chinese Application No. 201610141114.7 dated Nov. 1, 2017, 13 pages. (with English translation).

Office Action issued in U.S. Appl. No. 15/131,802, dated Oct. 30, 2017, 12 pages.

* cited by examiner

REFRIGERATOR

CROSS-REFERENCE TO RELATED APPLICATIONS

The present application claims priority under 35 U.S.C. 119 and 35 U.S.C. 365 to Korean Patent Application No. 10-2014-0015278, filed on Feb. 11, 2014, which is hereby incorporated by reference in its entirety.

TECHNICAL FIELD

The present disclosure relates to a refrigerator.

BACKGROUND

Refrigerators are home appliances for storing foods at a low temperature. Such a refrigerator can include one or all of a refrigerating compartment for storing foods in a refrigerated state and a freezing compartment for storing foods in a frozen state. In some cases, a dispenser may be mounted on a front surface of a door of the refrigerator. Thus, water may be dispensed through the dispenser without opening the door. In addition, an ice maker for making ice cubes to store the made ice cubes may be disposed on the door or in the compartment. Thus, the ice cubes may be dispensed through the dispenser.

SUMMARY

According to one aspect, a refrigerator includes a main body having a refrigerating compartment and a freezing compartment, a door configured to open or close at least a portion of the refrigerating compartment or the freezing compartment, a filter unit disposed within the refrigerating compartment and configured to purify water supplied from a water supply source outside the main body, a water tank configured to receive the purified water from the filter unit and to cool the received water by using cool air within the refrigerating compartment, a tube tank assembly disposed in the door and configured to store cooled water received from the water tank, and a dispenser disposed in the door and configured to dispense the cooled water stored in the tube tank assembly. The tube tank assembly includes a tube defining a cold water passage that is configured to allow the cooled water to flow therethrough, and a tube support around which the tube is wound multiple times.

Implementations of this may include one or more of the following features. For example, the tube may be wound around the tube support in one layer. The tube support may include a support plate configured to support the tube, an extension part around which the tube is wound, with the extension part extending from the support plate, and a separation prevention part configured to prevent the tube wound around the extension part from being separated from the extension part. A distance between the support plate and the separation prevention part may be equal to or larger than an outer diameter of the tube and less than two times of the outer diameter of the tube thereby allowing the tube to be wound around the extension part in one layer. The separation prevention part may extend from the extension part in a direction parallel to the support plate. The support plate may define an insertion part that allows the tube to be wound around the extension part by passing through the insertion part, and a withdrawal part through which the tube that is wound around the extension part passes. The door may be a freezing compartment door configured to open or close the freezing compartment, a temperature sensor may be disposed on the separation prevention part, and a heater configured to heat the tube may be disposed on the support plate. A heat conductive member may be disposed between the separation prevention part and the tube. The door may be a freezing compartment door, the dispenser may include a dispenser housing, and a coupling part coupled to the dispenser housing may be disposed on the support plate. The door may include an outer case and a door liner connected to the outer case, and in a state in which the coupling part is coupled to the dispenser housing, the support plate may be spaced apart from the dispenser housing, and the separation prevention part is spaced apart from a back surface of the door liner. All or a portion of the tube may be disposed between the back surface of the door liner and a first reference line that bisects a distance between the dispenser housing the back surface of the door liner. All or a portion of the tube may be disposed between the first reference line and a second reference line that bisects a distance between the first reference line and the back surface of the door liner. The door may be a refrigerating compartment door configured to open or close at least a portion of the refrigerating compartment, and the refrigerating compartment door may include an outer case, a door liner connected to the outer case, the door liner having an accommodation part accommodating the tube tank assembly, and a cover configured to cover the accommodation part. The separation prevention part may contact the cover. The separation prevention part may include a plurality of separation prevention parts that extend from the extension part and are spaced apart from each other, and a pressing part that is configured to press the tube wound around the extension part toward the cover may be disposed on the support plate, the pressing part being disposed at a location corresponding to an area between two adjacent separation prevention parts. The separation prevention part may be a wire that is configured to wind around the tube wound around the extension part and the support plate.

According to another aspect, a refrigerator includes a main body having a refrigerating compartment and a freezing compartment, a refrigerating compartment door configured to open or close at least a portion of the refrigerating compartment, a freezing compartment door configured to open or close at least a portion of the freezing compartment, the freezing compartment door including an outer case and a door liner, a filter unit disposed within the refrigerating compartment and configured to purify water supplied from a water supply source outside the main body, a water tank configured to receive the purified water from the filter unit and to cool the received water by using cool air within the refrigerating compartment, a tube tank assembly disposed in the freezing compartment door and configured to store cooled water received from the water tank, and a dispenser disposed in the freezing compartment door and configured to dispense the cooled water stored in the tube tank assembly, the dispenser including a dispenser housing. The tube tank assembly includes a tube support, and a tube wound multiple times around the tube support, the tube being spaced apart from the dispenser housing and the door liner.

Implementations of this may include one or more of the following features. For example, the tube may be wound around the tube support in one layer. The tube support may include a support plate configured to support the tube, an extension part around which the tube is wound, the extension part extending from the support plate, and a separation prevention part configured to prevent the tube wound around the extension part from being separated from the extension part. A distance between the support plate and the separation prevention part may be equal to or larger than an outer diameter of the tube and less than two times of the outer diameter of the tube thereby allowing the tube to be wound around the extension part in one layer.

According to yet another aspect, a refrigerator includes a main body having a refrigerating compartment and a freezing compartment, a refrigerating compartment door configured to open or close at least a portion of the refrigerating compartment, the refrigerating compartment door including an outer case and a door liner, a freezing compartment door configured to open or close at least a portion of the freezing compartment, a filter unit disposed within the refrigerating compartment and configured to purify water supplied from a water supply source outside the main body, a water tank configured to receive the purified water from the filter unit and to cool the received water by using cool air within the refrigerating compartment, a tube tank assembly disposed in an accommodation part defined in the door liner and configured to store cooled water received from the water tank, a cover configured to cover the tube tank assembly, and a dispenser disposed in the freezing compartment door and configured to dispense cooled water stored in the tube tank assembly. The tube tank assembly includes a tube support contacting the cover, and a tube wound multiple times around the tube support.

Implementations of this may include one or more of the following features. For example, the tube may be wound around the tube support in one layer. The tube support may include a support plate configured to support the tube, an extension part around which the tube is wound, the extension part extending from the support plate, and a separation prevention part configured to prevent the tube wound around the extension part from being separated from the extension part. A distance between the support plate and the separation prevention part may be equal to or larger than an outer diameter of the tube and less than two times of the outer diameter of the tube thereby allowing the tube to be wound around the extension part in one layer.

The details of one or more embodiments are set forth in the accompanying drawings and the description below. Other features will be apparent from the description and drawings, and from the claims.

DETAILED DESCRIPTION

Reference will now be made in detail to the implementations of the present disclosure, examples of which are illustrated in the accompanying drawings.

In the following detailed description of the preferred implementations, reference is made to the accompanying drawings that form a part hereof, and in which is shown by way of illustration specific preferred implementations in which the disclosure may be practiced. These implementations are described in sufficient detail to enable those skilled in the art to practice the disclosure, and it is understood that other implementations may be utilized and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense.

Also, in the description of implementations, terms such as first, second, A, B, (a), (b) or the like may be used herein when describing components of the present disclosure. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
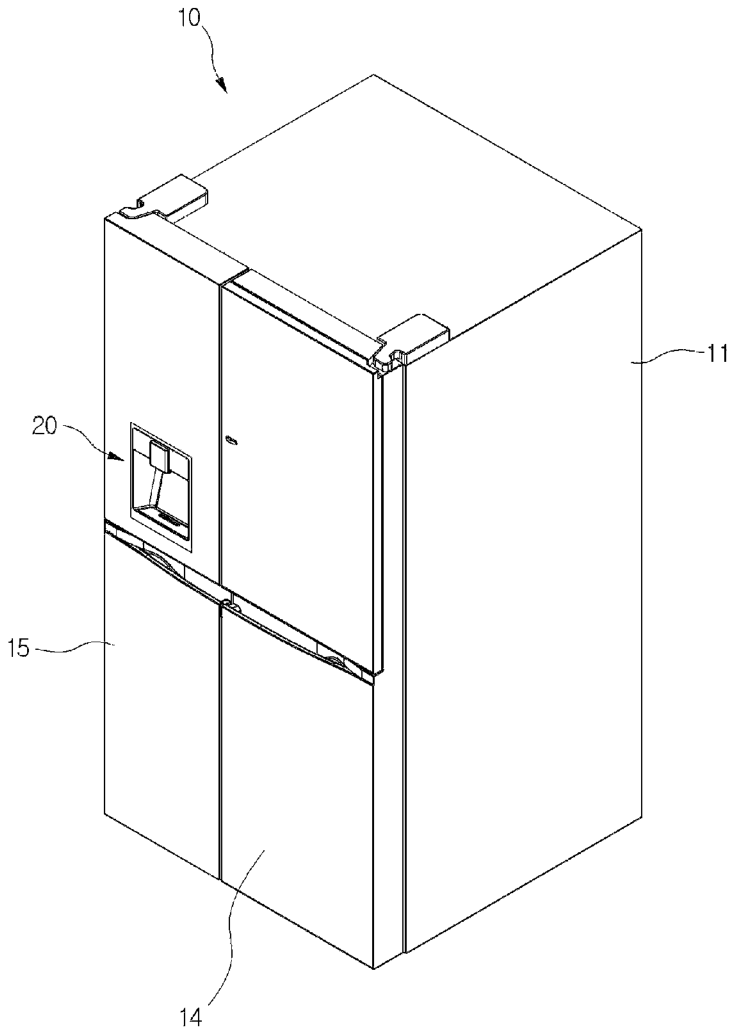
FIG. 1 is a perspective view illustrating an example of a refrigerator according to a first implementation.
Figure 2:
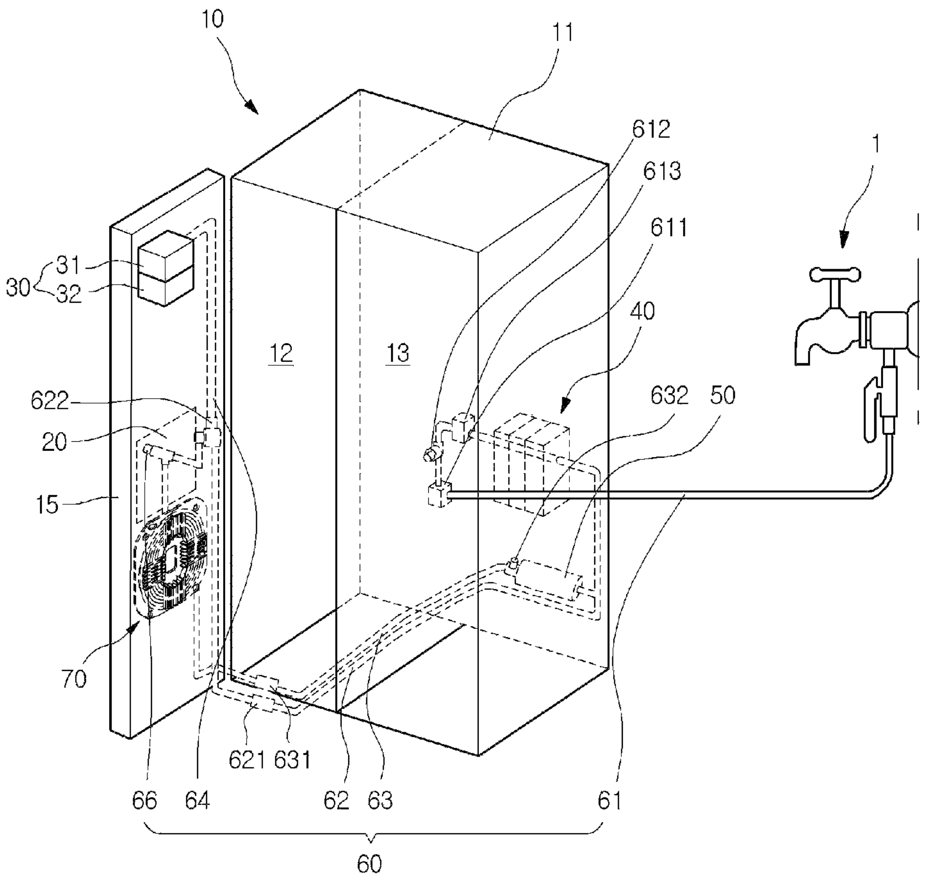
FIG. 2 is a schematic view illustrating an arrangement of passages through which water of the refrigerator flows.

FIG. 1 illustrates a refrigerator according to a first implementation, and FIG. 2 illustrates an arrangement of passages through which water of the refrigerator can flow.

Referring to FIGS. 1 and 2, a refrigerator 10 according to the current implementation includes a main body 11 having a storage space with a front surface opened and a door for opening/closing the storage space.

Here, elements of the storage space may be different according to a type and configuration of the refrigerator. For example, although a freezing compartment 12 is shown disposed at a left side, and a refrigerating compartment 13 is shown disposed at a right side with respect to a barrier in FIG. 1, the current implementation is not limited to types of refrigerators, positions of a freezing compartment and refrigerating compartment, and the number of freezing compartment and refrigerating compartment.

The door may include a refrigerating compartment door 14 and a freezing compartment door 15. Also, upper and lower ends of the door may be rotatably connected to the main body 11 by hinges to open or close each of the refrigerating compartment 13 and the freezing compartment 12.

A dispenser 20 may be disposed in a front surface of the refrigerating compartment door 14 or the freezing compartment door 15. For example, FIG. 1 illustrates the dispenser 20 disposed in the freezing compartment door 15. The dispenser 20 may dispense water or ice cubes at the outside without requiring opening of the freezing compartment door 15.

An ice making unit 30 may be disposed on a back surface of the freezing compartment door 15. The ice making unit 30 may freeze supplied water to make ice cubes and also store the made ice cubes. Particularly, the ice making unit 30 may include an automatic ice maker 31 in which water is automatically supplied to make ice cubes and transfer the made ice cubes and an ice bank 32 disposed under the automatic ice maker 31 to store the ice cubes transferred from the automatic ice maker 31.

Also, the ice bank 32 may communicate with the dispenser 20 through an ice chute. Thus, when a manipulation part disposed on the dispenser 20 is manipulated, the ice cubes within the ice bank 32 may be dispensed through the dispenser 20. Also, a feature configured to dispense the stored ice cubes in a cubed ice state or crushed ice rubble state according to user's selection may be further provided in the ice bank 32.

A filter unit 40 for purifying water supplied from an external water supply source 1 and a water tank 50 for storing the water purified by passing through the filter unit 40 to cool the stored water by using cool air may be disposed in the main body 11.

To supply water into the dispenser 20 and the ice making unit 30, the refrigerator 10 may be connected to the external water supply source 1. Also, a water supply flow path 60 connected to the water supply source 1, the filter unit 40, the water tank 50, the dispenser 20, and the ice making unit 30 to guide a flow of the water may be disposed in the main body 11 and the freezing compartment door 15.

The water supply flow path 60 may include a water supply passage 61 connecting the water supply source 1 disposed outside the main body 11 to the filter unit 40 disposed in the main body 11, a purified water passage 62 for guiding the purified water into the dispenser 20, a cold water passage 63 for guiding the water purified by the filter unit 40 into the dispenser 20 via the water tank 50, and an ice making passage 64 branched from the purified water passage 62 to guide the water purified by the filter unit 40 into the ice making unit 30.

The water supply passage may extend from the water supply source 1 to the inside of the main body 11 and then be connected to the filter unit 40. Here, the water supply passage 61 may be provided in two tubes with respect to the main body 11 and connected to a fitting member 611.

Here, the fitting member 611 may be disposed on a rear surface of the main body 11 so that a user selectively separates a tube of the water supply passage 61, which is connected to the water supply source 1. Also, if necessary, a cleaning unit that is a separate unit may be connected to sterilize and clean the water tank 50 as well as the water supply flow path 60.

A water supply valve 612 may be disposed in the water supply passage 61. The water supply valve 612 may open or close the water supply passage 61 to adjust an amount of water supplied into the filter unit 40. The water supply valve 612 may be disposed at one side of the main body 11. Also, if necessary, the water supply valve 612 may be integrated with the fitting member 611. The filter unit 40 may be disposed in the refrigerating compartment 13, and the water supply passage 61 may extend up to the inside of the refrigerating compartment 13.

The purified water passage 62 may connect the filter unit 40 to the dispenser 20. The purified water passage 62 may extend from an outlet of the filter unit 40 to one side of the dispenser 20 to supply the water purified in the filter unit 40 into the dispenser 20.

The purified water passage 62 may extend from the refrigerating compartment 13 in which the filter unit 40 is disposed to the freezing compartment door 15 in which the dispenser is disposed. The purified water passage 62 may pass through a hinge connecting the main body 11 to the freezing compartment door 15. Here, a fitting member 621 may be disposed on the water supply passage 61 corresponding to the position of the hinge to connect the purified water passage 62 that is divided into two door-side and main body-side parts. Thus, the purified water passage 62 and the cold water passage 63 may be separable according to the mounting and separation of the freezing compartment door 15.

Also, a purified water valve 622 may be disposed in the purified water passage 62. The purified water valve 622 may open or close the purified water passage 62 to selectively discharge the purified water into the dispenser 20. The purified water valve 622 may be, for example, a three-way valve that divides the water supplied from the purified water passage 62 to supply the divided water into the dispenser 20 and the ice making unit 30.

That is, the purified water valve 622 may be disposed in the purified water passage 62 and be connected to the ice making passage that is branched at the dispenser 20 or the freezing compartment door 15 to extend to the ice making unit 30. Thus, the purified water passing through the filter unit 40 may be directly dispensed into the dispenser 20 or supplied into the ice making unit 30.

The purified water passage 62 and the cold water passage 63 may be connected to a dispensing passage 66. Thus, cold water or purified water may be dispensed from the dispensing passage 66.

Also, the purified water supplied through the ice making passage 64 may have a temperature relatively greater than that of the cold water within the cold water passage to prevent the water within the ice making passage 64 disposed in the freezing compartment door 15 from being frozen while flowing along the ice making passage 64, thereby stably supplying water into the ice making unit 30.

The cold water passage 63 extends from the refrigerating compartment 13 to the freezing compartment door 15. The cold water passage 63 is configured to supply the water purified in the filter unit 40 into the dispenser 20 after the water is cooled by passing through the water tank 50.

Here, the cold water passage 63 may be connected to a fitting member 631 so that the cold water passage 63 is guided into the freezing compartment door 15 through the hinge. Thus, the purified water passage 62 that is divided into the two door-side and main body-side parts may be connected by the fitting member 631.

The cold water passage 63 may be directly connected to the filter unit 40. Alternatively, the cold water passage 63 may be branched at the purified passage 62 and then connected to the water tank 50. Also, a cold water valve 632 for selectively opening or closing the cold water passage 63 to selectively discharge the cold water dispensed from the dispenser 20.

The cold water valve 632 may be disposed in the cold water passage 63 between the water tank 50 and the dispenser 20. The cold water valve may be opened or closed to determine the supply of water into the dispenser 20.

A tube tank assembly 70 for preventing the cold water dispensed when the cold water is initially dispensed from increasing in temperature due to an increase in amount of cold water remaining in the freezing compartment door 15 may be disposed in the freezing compartment door 15. The tube tank assembly 70 will be described below with reference to the accompanying drawings.

Figure 3:
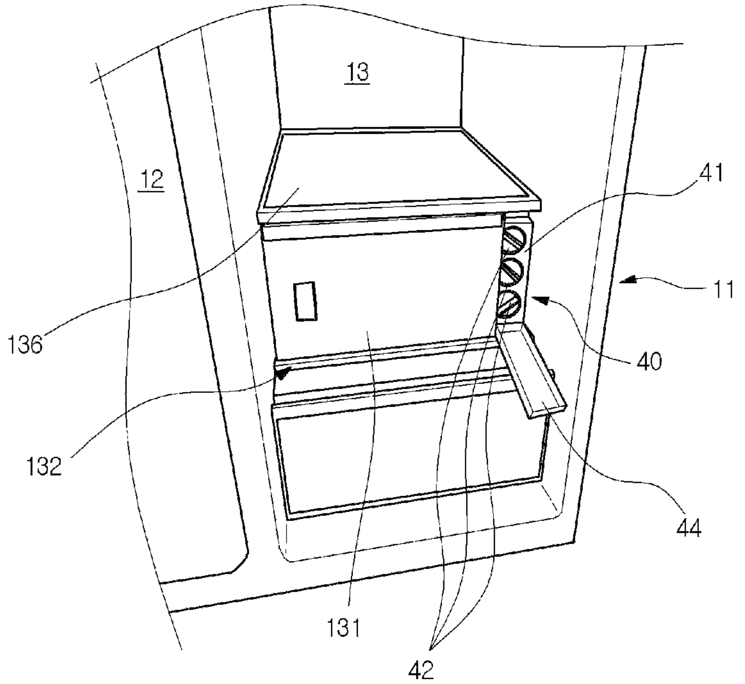
FIG. 3 is a partial perspective view illustrating a portion of an inner space of the refrigerator.
Figure 4:
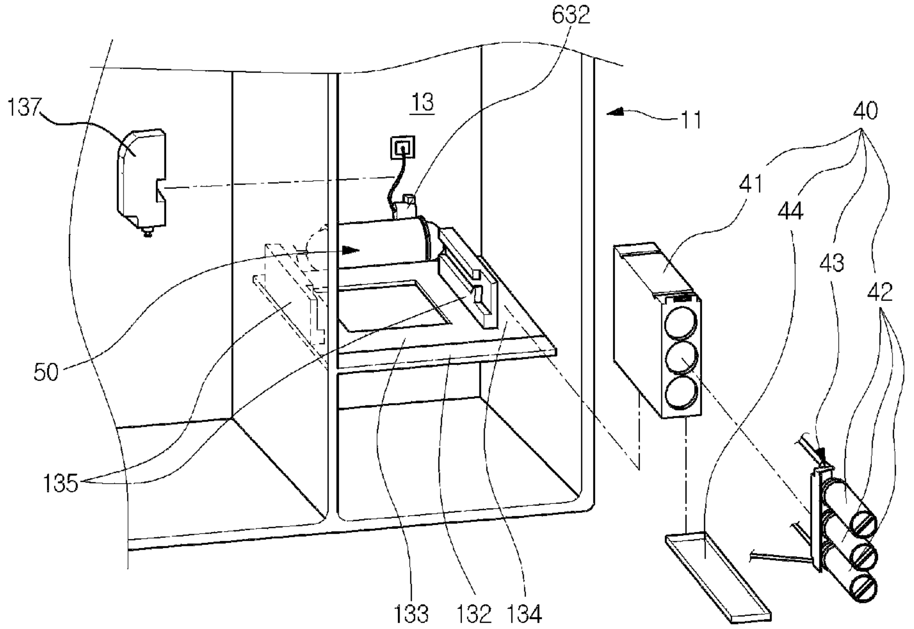
FIG. 4 is a view illustrating mounted states of a water tank and a filter unit according to the first implementation.

FIG. 3 illustrates a portion of an inner space of the refrigerator, and FIG. 4 illustrates mounted states of a water tank and a filter unit according to the first implementation.

Referring to FIGS. 3 and 4, a plurality of receiving members 131 such as a drawer and shelf may be disposed in the refrigerating compartment 13. The receiving members 131 may partition the inside of the refrigerating compartment to form receiving spaces having various shapes. Also, the receiving members 131 may be disposed adjacent to the filter unit 40.

A support member 132 may be disposed on one side of the refrigerating compartment 13. The support member 132 supports lower portions of the receiving member 131 and the filter unit 40. The support member 132 may be disposed on a bottom surface of the refrigerating compartment 13 or a top surface of the other receiving member. Also, the support member 132 may be a plate that vertically partitions the inside of the refrigerating compartment 13.

A top surface of the support member 132 may be divided into two areas, i.e., a receiving member mounting part 133 for mounting the receiving member 131 and a filter unit mounting part 134 for mounting the filter unit 40. Also, a plurality of insertion/withdrawal guides 135 for guiding slidable insertion or withdrawal of the receiving member 131 in a front/rear direction may be disposed on left and right sides of the receiving member mounting part 133.

Also, the filter unit 40 may be mounted on the filter unit mounting part 134. For example, the filter unit 40 may be disposed between the receiving member 131 and an inner wall of the refrigerating compartment 13. Also, the filter unit 40 may have front and top surfaces corresponding to those of the receiving member 131 so that the filter unit 40 a sense of unity with respect to the receiving member 131 inside the refrigerating compartment 13.

Also, a shelf 136 for covering top surfaces of the receiving member 131 and the filter unit 40 at the same time may be disposed above the filter unit 40 and the receiving member 131.

Rear surfaces of the receiving member 131 and the filter unit 40 may be spaced apart from a rear wall of the refrigerating compartment 13. The water tank 50 may be disposed between a rear side of the receiving member 131 and the filter unit 40 and the rear wall of the refrigerating compartment 13. The water purified in the filter unit 40 may be stored in the water tank 50. Then, the water may be cooled by cool air within the freezing compartment 12, and then the cold water may be supplied again into the dispenser 20.

Also, the water supply flow path 60 may be connected to the water tank 50 and then be connected to the filter unit 40. Also, a portion of the cold water passage 63 connected to the dispenser 20 may be disposed in a space in which the water tank 50 is disposed. Also, the cold water valve 632 may be fixedly mounted on the rear wall of the refrigerating compartment 13 above the water tank 50. Also, for safety, the cold valve 632 may be covered by the valve cover 137. As described above, the water tank 50, the cold water valve 632, and a portion of the water supply flow path 60 may be disposed in a space defined between the rear wall of the refrigerating compartment in which the water tank 50 is disposed and the receiving member 131 and filter unit 40.

The receiving member 131 may have the same front/rear length as the filter unit 40. Also, the front surface of the receiving member 131 and the front surface of the filter unit 40 may be disposed on the same plane.

Figure 5:
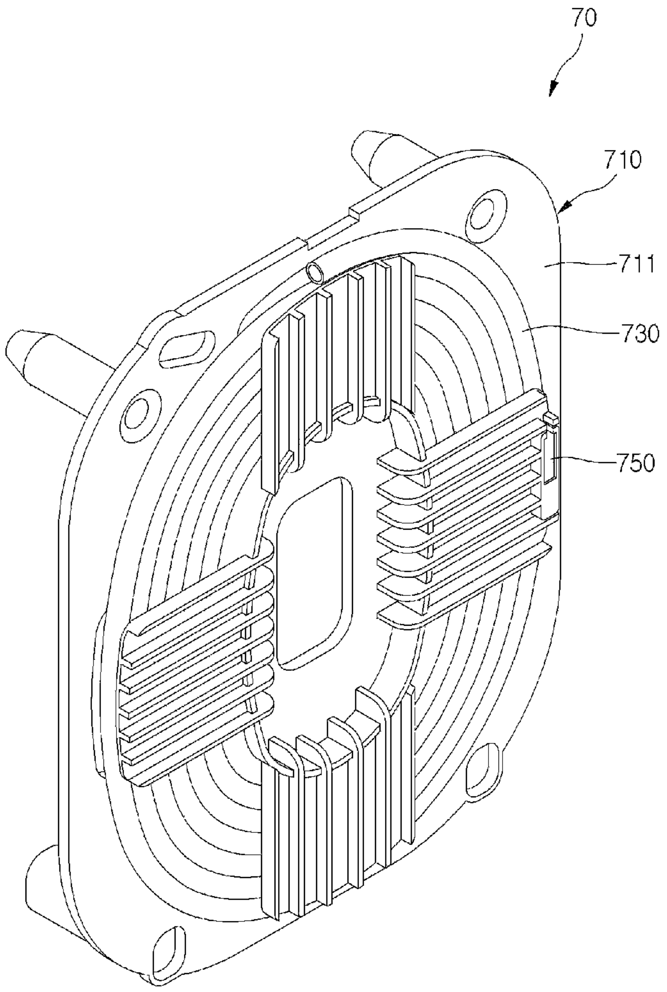
FIG. 5 is a perspective view of a tube tank assembly according to the first implementation.
Figure 6:
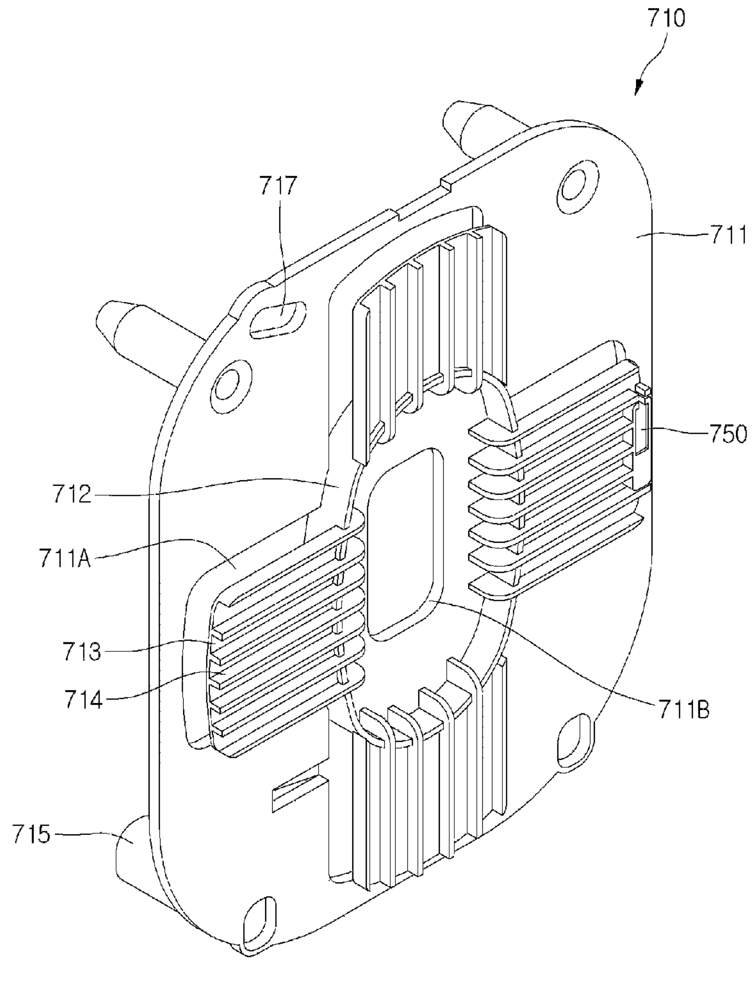
FIG. 6 is a perspective view of a tube support of the tube tank assembly.
Figure 7:
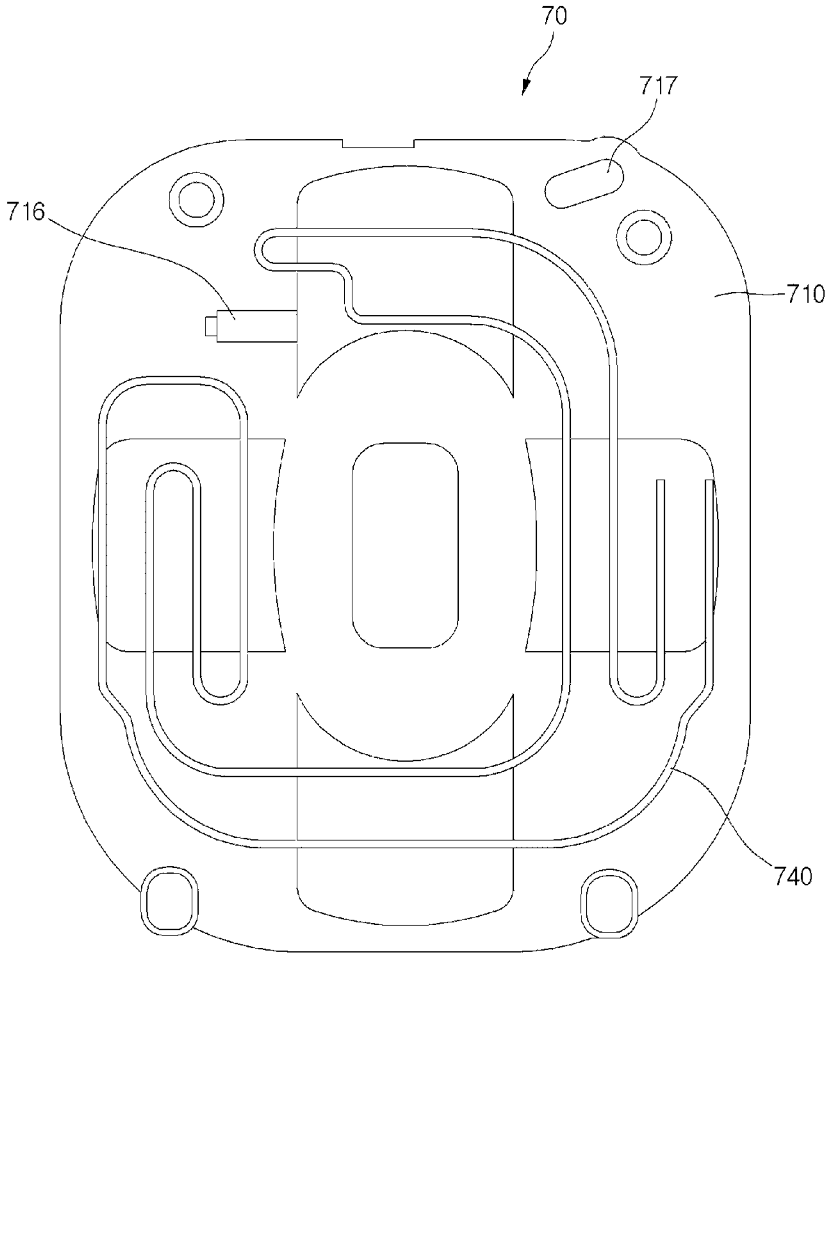
FIG. 7 is a rear view of the tube support of FIG. 6.
Figure 8:
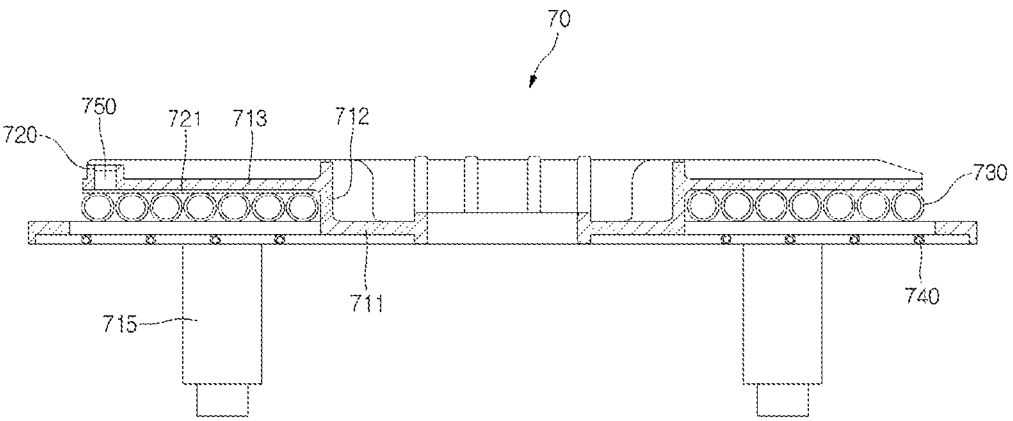
FIG. 8 is a cross-sectional view of the tube tank assembly of FIG. 5.

FIG. 5 illustrates the tube tank assembly according to the first implementation, FIG. 6 illustrates a tube support constituting the tube tank assembly, FIG. 7 illustrates the tube support of FIG. 6, and FIG. 8 illustrates a cross-sectional view of the tube tank assembly of FIG. 5.

Referring to FIGS. 5 to 8, the tube tank assembly 70 according to the current implementation may be disposed in the freezing compartment door 15 as described above.

The tube tank assembly 70 may include a tube 730 constituting a portion of the cold water passage 63 and a tube support 710 around which the tube 730 is wound. The tube support 710 may include a first plate 711, an extension part 712 extending from the first plate 711, and at least one second plate 713 extending from extension part 712 in a direction parallel to the first plate 711.

The first and second plates 711 and 713 are spaced apart from each other by the extension part 712, and the tube 730 may be wound several times around the extension part 712. Here, the tube 730 of the tube support 710 may be wound in a circular line shape so that the cold water within the tube 730 has a uniform temperature. For example, the tube 730 of the tube support 710 may be wound in one layer. To wind the tube 730 around the extension part 712 in a line, a distance between the first and second plates 711 and 713 may be equal to or larger than an outer diameter of the tube 730 and less than one and a half times of the outer diameter of the tube 730. When the tube 730 is wound in a line, the bending of the tube 730 may be minimized to reduce flow resistance and prevent the tube 730 from being damaged by the bending of the tube 730.

An insertion part 716 through which the tube 730 to be wound around the extension part 712 passes may be provided in the first plate 711. An extension direction of the insertion part 716 may correspond to a direction of tangent of the extension part 712. Also, a withdrawal part 717 through which the tube 730 to be wound around the extension part 712 passes may be provided in the first plate 711. For example, the withdrawal part 717 may be a hole.

A connection hole 711B to which a winding unit is connected may be defined in a central portion of the first plate 711 so that the tube passing through the insertion part 716 is automatically wound around the extension part 712. Thus, the winding unit may rotate the tube support 710 in a state where the winding unit is connected to the connection hole 711B to wind the tube 730 around the tube support 710.

A plurality of coupling parts 715 to be coupled to the dispenser 20 may be disposed on the first plate 711. The plurality of coupling parts 715 may extend in a direction opposite to the extension direction of the extension part 712 on the first plate 711.

The second plate 713 may prevent the tube 730 wound around the extension part 712 from being separated from the extension part 712. To effectively prevent the tube 730 from being separated, a plurality of second plates 713 may extend from the extension part 712. The plurality of second plates 713 may be disposed to be spaced a predetermined distance from each other.

As illustrated in the current implementation, since the first plate 711 supports the tube 730, and the second plates 713 prevent the separation of the tube 730 wound around the extension part 712, the first plate 711 may be called a support plate, and the second plate 713 may be called a separation prevention part.

Also, at least one strength reinforcement rib 714 for reinforcing strength may be disposed on each of the plurality of second plates 713. While the tube 730 is wound around the extension part 712, or water flows into the tube 730, the second plate 713 may be deformed in a direction that is away from the first plate 711. The strength reinforcement rib 714 may reduce the deformation of the second plate 713. In addition, when the second plate 713 is deformed, the strength reinforcement rib 714 may prevent the second plate 713 from being damaged.

Also, to improve the strength of the first plate 711, a hole 711A may be defined in a portion of the first plate facing the second plate 713. The hole 711A may provide a space in which a portion of the tube 730 is disposed while the tube 730 is wound around the extension part 712 or a space in which the tube 730 is evaded when the tube 730 is expanded to reduce the deformation of the second plate 713.

A heater 740 for heating the tube 730 may be disposed on a surface opposite to a surface of the first plate 711 on which the extension part 712 is disposed. The heater 740 may be a wire-type heater. The heater 740 may heat the tube 730 disposed in the freezing compartment door 15 to prevent the cold water within the tube 730 from being frozen.

A temperature sensor 750 for detecting a temperature of the tube 730 may be disposed on one of the plurality of second plates 713. A sensor installation hole 720 in which the temperature sensor 750 is installed may be defined in the second plate 713. A heat conductive member 721 for increasing heat conductivity may be disposed on a surface of the second plate 713, on which the temperature sensor 750 is disposed, facing the first plate 711. That is, the heat conductive member 721 may be disposed between the tube 730 and the second plate 713. In some cases, the heat conductive member 721 may be an aluminum tape. Also, the temperature sensor 750 and the tube 730 may contact the heat conductive member 721.

When the temperature detected by the temperature sensor 750 reaches a reference temperature, a control unit may operate the heater 740 to prevent the cold water within the tube 730 from being frozen.

Figure 9:
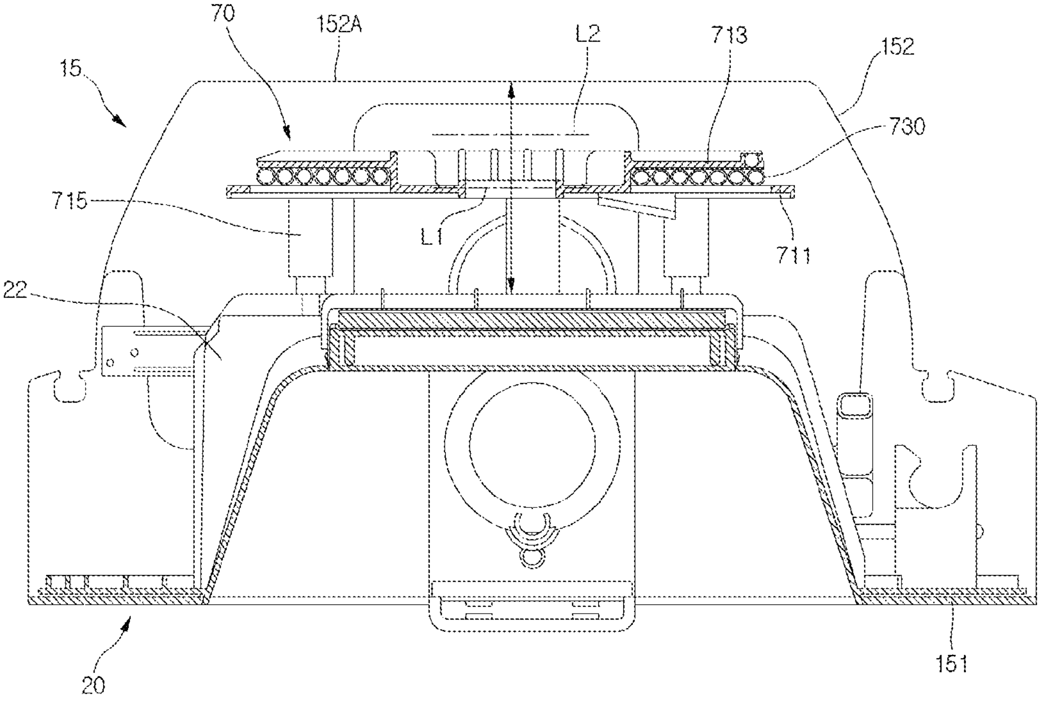
FIG. 9 is a view of a state in which the tube tank assembly is installed in a freezing compartment door according to the first implementation.

FIG. 9 is illustrates the tube tank assembly as installed in the freezing compartment door according to the first implementation.

Referring to FIG. 9, the freezing compartment door 15 may include an outer case 151 and a door liner 172 directly connected to the outer case 151 or indirectly connected to the outer case 151 by a connection member. The dispenser 20 may include a dispenser housing 22 coupled to the outer case 151 between the outer case 151 and the door liner 152.

Also, the tube support 710 may be coupled to the dispenser housing 22. For example, the coupling part 715 of the tube support 710 and the dispenser housing 22 may be coupled to each other by a coupling member such as a screw. In the state where the tube support 710 is coupled to the dispenser housing 22, the second plate 713 may be spaced apart from a back surface 152A of the door liner 152 facing the second plate 713. Thus, an insulation material may be disposed between the tube tank assembly 70 and the door liner 152. According to an embodiment, the insulation material disposed between the rear surface of the dispenser housing and the door liner has a thickness that is relatively thinner than those of other portions in the freezing compartment door. Thus, moisture outside the dispenser housing may be condensed on the dispenser housing to form dewdrop. However, according to the current embodiment, since the tube tank assembly including the heater is disposed on the rear surface of the dispenser housing, the freezing of the water within the tube may be prevented by the heater. In addition, the formation of the dewdrop on the dispenser housing may be prevented.

Also, the first plate 711 may be spaced apart from a back surface of the dispenser housing 22 by the coupling part 715. Thus, an insulation material may be disposed between the tube tank assembly 70 and the dispenser housing 22.

Also, when a line bisecting a distance between the dispenser housing 22 and the back surface 152A of the door liner 152 is defined as a first reference line L1, a portion or whole of the tube 730 may be disposed between the first reference line L1 and the back surface 152A of the door liner 152.

Also, when a line bisecting a distance between the first reference line L1 and the back surface 152A of the door liner 152 is defined as a second reference line L2, a portion or whole of the tube 730 may be disposed between the first reference line L1 and the second reference line L2.

According to the implementations described above, on or more of the following effects may be expected.

First, since the tube is disposed within the freezing compartment door in the state where the tube is wound around the tube support, the cold water passage provided in the freezing compartment door increases in length to allow the tube wound around the tube support to serve as a tank. Thus, when the cold water is initially dispensed, an amount of discharged cold water may increase.

Also, since the tube is maintained in the state the tube is wound around the tube support in a line, the cold water within the tube may have a generally uniform temperature. Thus, the temperature of the cold water dispensed to the outside of the refrigerator may be approximately equal to that of the cold water within the tube.

Also, since the tube is wound around the tube support in a line, the increase in thickness of the tube assembly in the front/rear direction of the refrigerator door may be minimized to prevent the insulation performance of the freezing compartment door from being deteriorated.

Also, an amount of water that is capable of being contained in cup of water when the cold water is initially dispensed may exist in the tube wound around the tube support. Thus, since a capacity of the heater for heating the tube is minimized, an increase in power consumption due to the operation of the heater may be minimized.

Also, the insulation material may be disposed between the first plate and the dispenser housing to prevent the cold water within the tube wound around the tube support from increasing in temperature by external heat of the freezing compartment door.

Also, since the insulation material is disposed between the second plate and the back surface of the door liner, freezing of the cold water within the tube wound around the tube support due to the cool air of the freezing compartment may be minimized.

Furthermore, since at least one portion of the tube is disposed between the first reference line L1 and the second reference line L2, the water within the tube may be cooled, and also the freezing of the water due to the cool air within the freezing compartment may be minimized.

In the foregoing implementation, the second plate may function as the separation prevention part for preventing the tube wound around the tube support from being separated. However, in some cases, the first plate and the tube wound around the extension part may be wound together by using a wire to prevent the tube from being separated.

Figure 10:
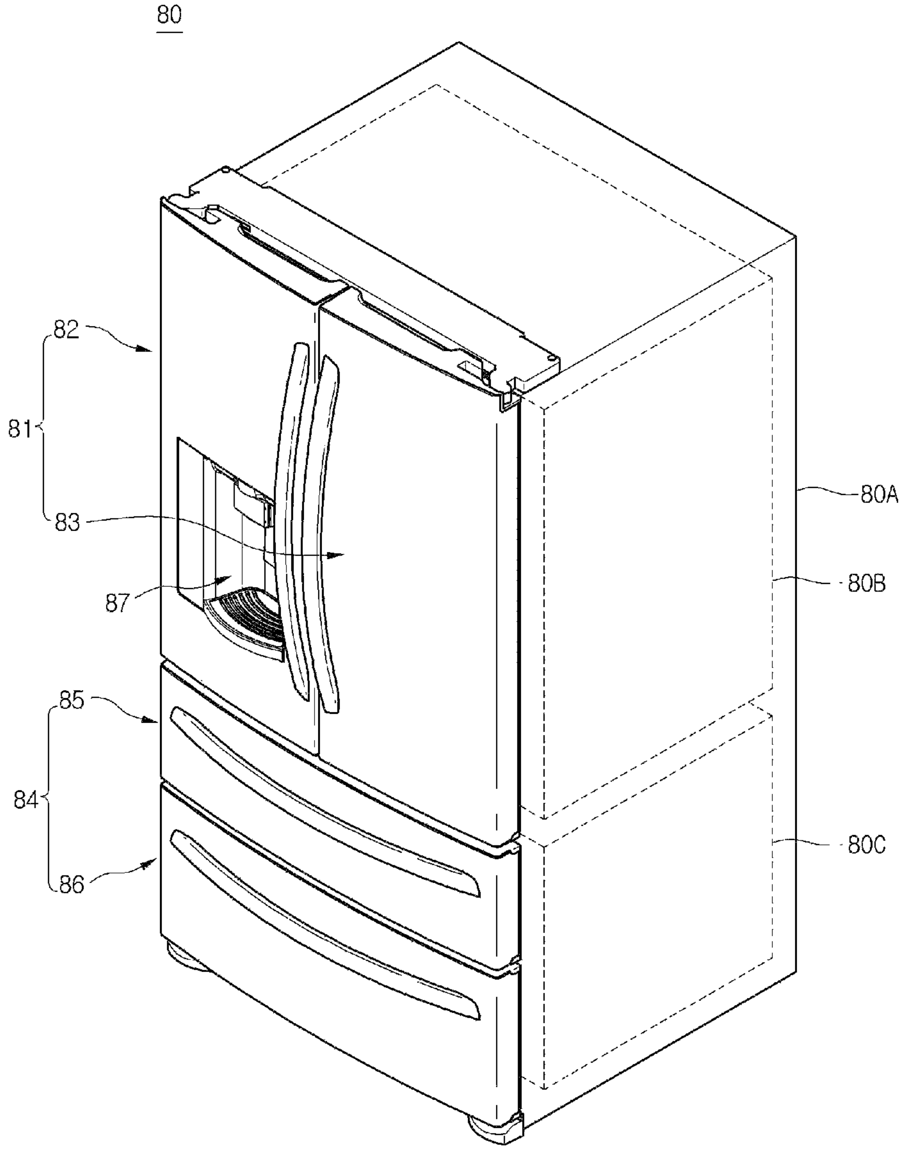
FIG. 10 is a perspective view of an example of a refrigerator according to another implementation.
Figure 11:
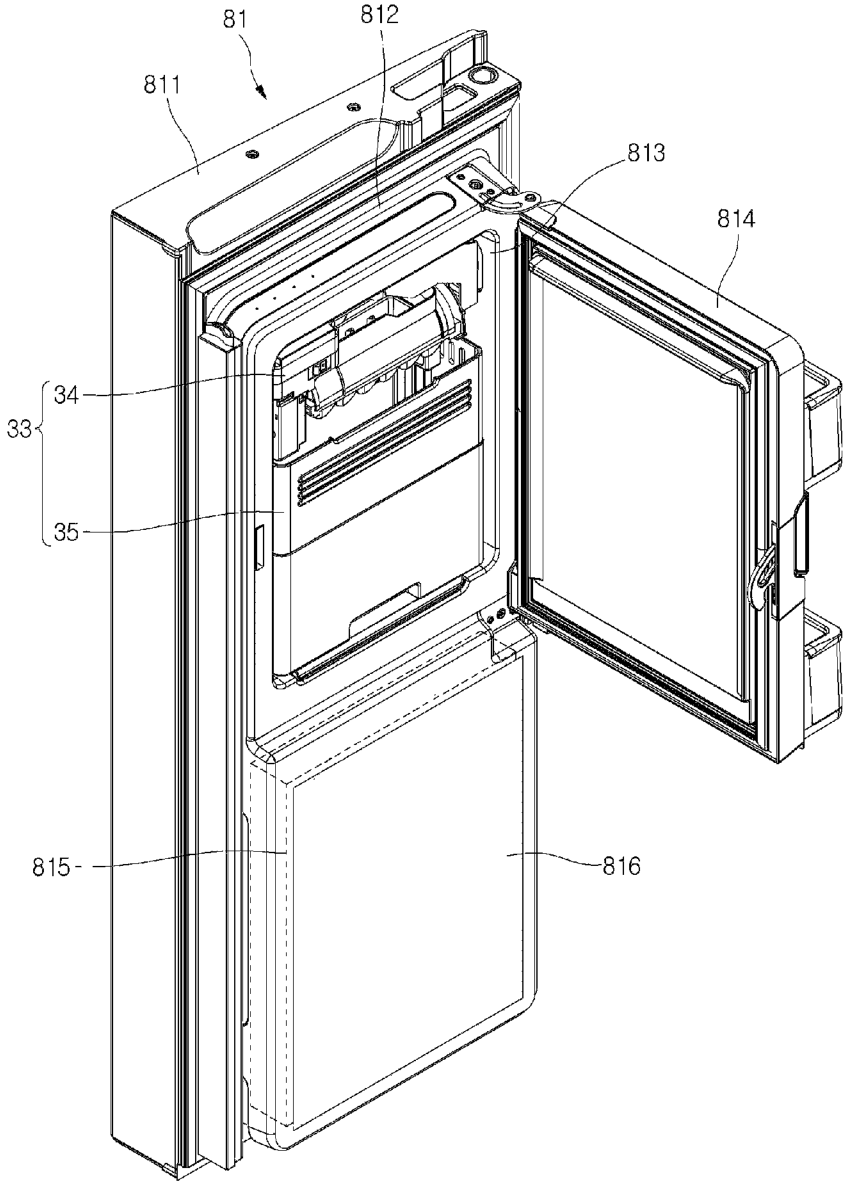
FIG. 11 is a perspective view of a refrigerating compartment door according to the second implementation.

FIG. 10 illustrates a refrigerator according to a second implementation, and FIG. 11 illustrates a refrigerating compartment door according to the second implementation.

Referring to FIGS. 10 and 11, a refrigerator 80 may include a main body 80A having a refrigerating compartment 80B and a freezing compartment 80C defined under the refrigerating compartment 80B, a refrigerating compartment door 81 connected to the main body 80A by a hinge to open or close the refrigerating compartment 80B, and a freezing compartment door 84 slidably coupled to the main body 80A or hinge-coupled to the main body 80A to open or close the freezing compartment 80C.

The refrigerating compartment door 81 may include a first refrigerating compartment door 82 and a second refrigerating compartment door 83, which are disposed in a horizontal direction. A dispenser 87 for dispensing water and ice cubes may be disposed in at least one of the first refrigerating compartment door 82 and the second refrigerating compartment door 83.

The freezing compartment door 84 may include a first freezing compartment door 85 and a second freezing compartment door 86, which are disposed in a vertical direction. Unlike this, one freezing compartment door 84 may open or close the refrigerating compartment 80B, or a plurality of freezing compartment doors are horizontally disposed to open or close the freezing compartment 80C.

The refrigerating compartment door 81 may include an outer case 811 defining an exterior thereof and a door liner 812 coupled to a rear side of the outer case 811.

The door liner 812 defines an ice making chamber 813. An ice making unit 33 may be accommodated in the ice making chamber 813. The ice making unit 30 may include an automatic ice maker 34 in which water is automatically supplied to make ice cubes and transfer the made ice cubes and an ice bank 35 disposed under the automatic ice maker 34 to store the ice cubes transferred from the automatic ice maker 34.

An ice making chamber door 814 for opening or closing the ice making chamber 813 may be connected to the door liner 812. Also, the door liner 812 may define an accommodation part 815 in which a tube tank assembly (see reference numeral 930 of FIG. 12) (or may be called an auxiliary water tank) is accommodated. A cover 816 for covering the accommodation part 815 is connected to the door liner 812.

Figure 12:
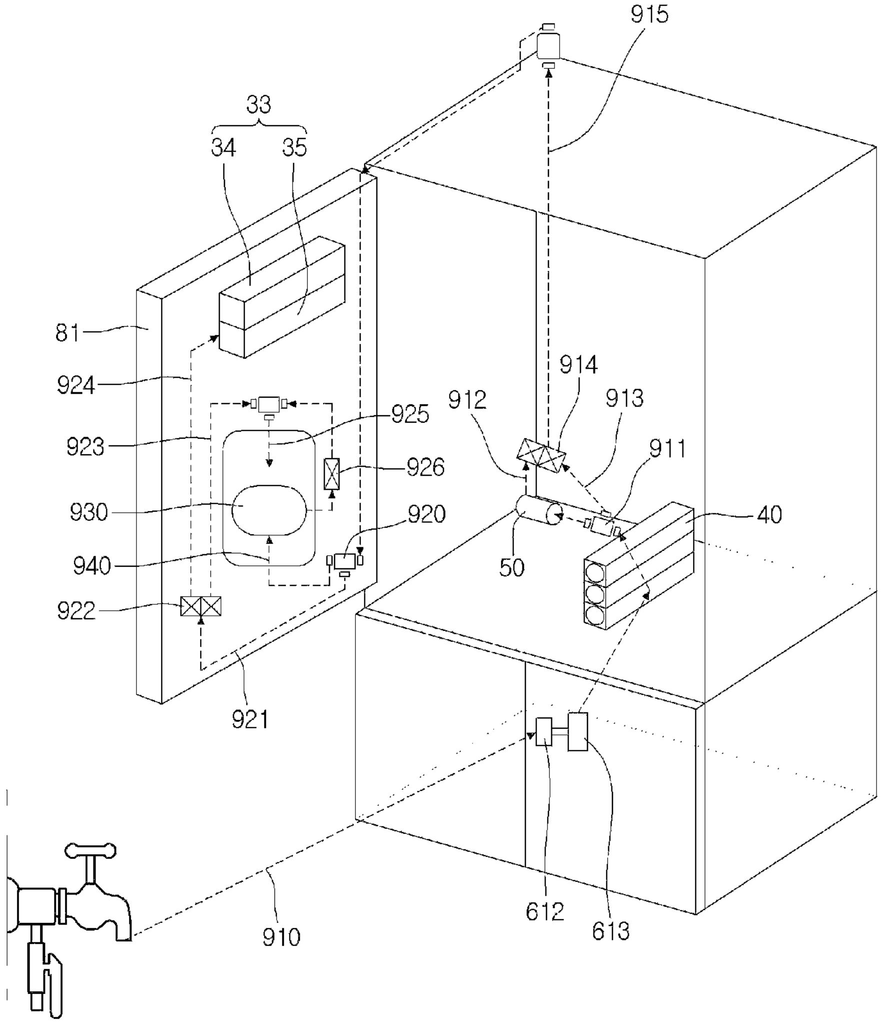
FIG. 12 is a schematic view illustrating an arrangement of passages through which water of the refrigerator of FIG. 11 flows.

FIG. 12 illustrates an arrangement of passages through which water of the refrigerator of FIG. 11 can flow.

Referring to FIG. 12, a filter unit 40 for purifying water supplied from an external water supply source and a water tank 50 for storing the water purified by passing through the filter unit 40 to cool the stored water by using cool air may be disposed in the main body 80A.

To supply water into the dispenser 87 and the ice making unit 33, the refrigerator 80 may be connected to an external water supply source. Also, a water supply flow path connected to the water supply source, the filter unit 40, the water tank 50, the dispenser 87, and the ice making unit 33 to guide a flow of the water may be disposed in the main body 80A and the refrigerating compartment door 81.

The water supply flow path may include a water supply passage 910 connecting the water supply source disposed outside the main body 80A to the filter unit 40 disposed in the main body 80A, a main body purified water passage 913 (also called a first purified water passage) through which the water purified in the filter unit 40 flows, a main body cold water passage 912 (also called a first cold water passage) through which the water purified in the filter unit 40 flows and connected to the water tank 50, and a common passage 915 (also called a first common passage) guiding the water of the main body purified water passage 913 or the water of the main body cold water passage 912 into the refrigerating compartment door 81.

A first flow adjustment valve 911 is disposed in a downstream side of the filter unit 40, and the main body purified water passage 913 and the main body cold water passage 912 is connected to the first flow adjustment valve 911.

Also, a second flow adjustment valve 914 is connected to the main body cold water passage 912 and the main body purified water passage 913. Also, the common passage 915 is connected to the second flow adjustment valve 914. For example, each of the flow adjustment valves 911 and 914 may be a three-way valve.

Thus, the cold water stored in the water tank 50 may flow into the common passage 915, or the purified water of the main body purified water passage 913 may flow into the common passage 915 by the control of the second flow adjustment valve 914.

The common passage 915 may pass through a hinge of the refrigerating compartment door 81 and then be inserted into the refrigerating compartment door 81.

According to the current implementation, since one common passage 915 passes through the hinge of the refrigerating compartment door 81, it may be unnecessary to increase a size of the hinge of the refrigerating compartment door 81.

The water supply flow path may further include a door purified water passage 921 for receiving the purified water from the common passage 915, a door cold water passage 940 (or called a second cold water passage) for receiving the cold water from the common passage 615, a purified water branch passage 923 through which the dispensed purified water flows, an ice making passage 924 supplying the purified water into the ice making unit 33, and a dispensing passage 925 (or called a second common passage) dispensing the purified water or cold water. The common passage 615, the door cold water passage 940, and the door purified water passage 921 may be connected to a third flow adjustment valve.

Also, the purified water branch passage 923, the ice making passage 924, and the door purified water passage 921 may be connected to a fourth flow adjustment valve 922.

A cold water adjustment valve 926 may be disposed in the door cold water passage 940. An end of the door cold water passage 940, an end of the purified water branch passage 923, and the dispensing passage 925 may be connected to a dispensing valve.

Here, the door purified water passage 921 and the purified water branch passage 923 may be generally called a second purified water passage. A flow within the second purified water passage may be adjusted by a fourth flow adjustment valve 922. Also, the fourth flow adjustment valve 922 may be called a purified water adjustment valve.

Also, a flow within the door cold water passage 940 may be adjusted by the cold water adjustment valve 926.

Also, a tube tank assembly 930 for preventing the cold water dispensed when the cold water is initially dispensed from increasing in temperature due to an increase in amount of cold water remaining in the refrigerating compartment door 81 may be disposed in the refrigerating compartment door 81.

Hereinafter, a flow of water in the refrigerator according to the current embodiment will be described.

Water supplied from the external water supply source may be purified while passing through the filter unit 40, and a portion of the purified water may be introduced into the water tank 50. When the cold water dispensing command is inputted, the cold water adjustment valve 926 is turned on. Also, the second flow adjustment valve 914 may operate to discharge the water within the water tank 50, and the cold water stored in the water tank 50 may pass through the second flow adjustment valve 914. Then, the cold water may be introduced into the refrigerating compartment door 81 along the common passage 915. The cold water introduced into the refrigerating compartment door 81 may pass through the tube tank assembly 930 by the third flow adjustment valve 920. The cold water passing through the tube tank assembly 930 may pass through the cold water adjustment valve 926 and then be dispensed to the outside through the dispensing passage 925.

When the purified water dispensing command is inputted, the second flow adjustment valve 914 may operate to discharge the water within the main body purified water passage 913, and the purified water stored in the main body purified water passage 913 may pass through the second flow adjustment valve 914. Then, the purified water may be introduced into the refrigerating compartment door 81 along the common passage 915. The purified water introduced into the refrigerating compartment door 81 may flow through the door purified water passage 921 by the third flow adjustment valve 920. The purified water flowing through the door purified water passage 921 may flow to the purified water branch passage 923 by the fourth flow adjustment valve 922, and finally, may be dispensed to the outside through the dispensing passage 925.

Here, if the supply of water into the ice making unit 30 is required, the purified water within the door purified water passage 921 may flow to the ice making passage 924 by the fourth flow adjustment valve 922, and the purified water flowing through the ice making unit 924 may be supplied to the ice making unit 30.

Figure 13:
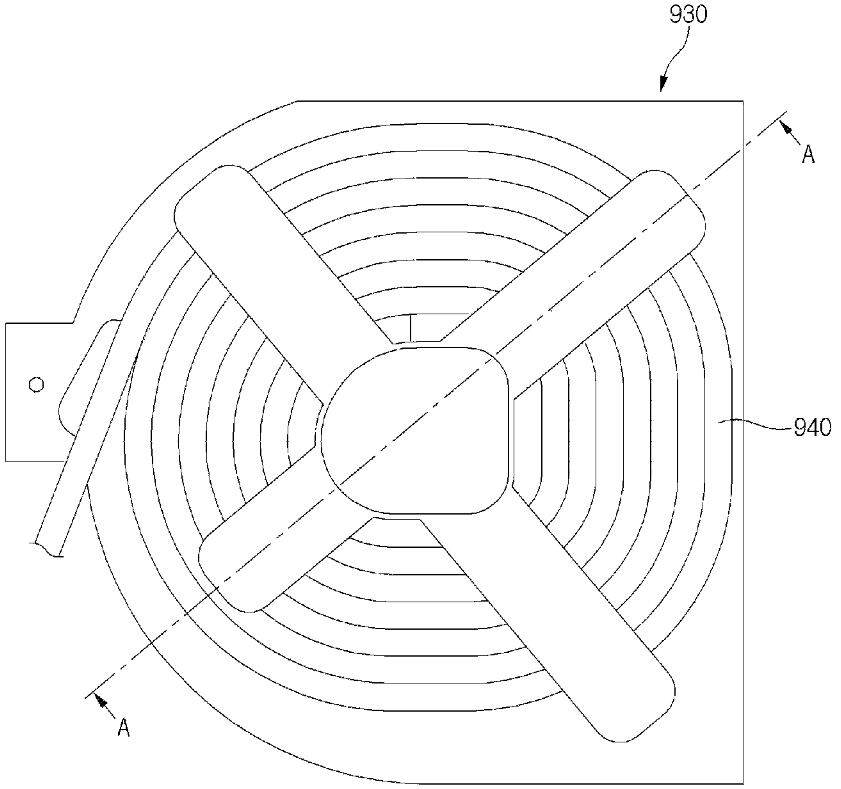
FIG. 13 is a front view of a tube tank assembly according to the second implementation.
Figure 14:
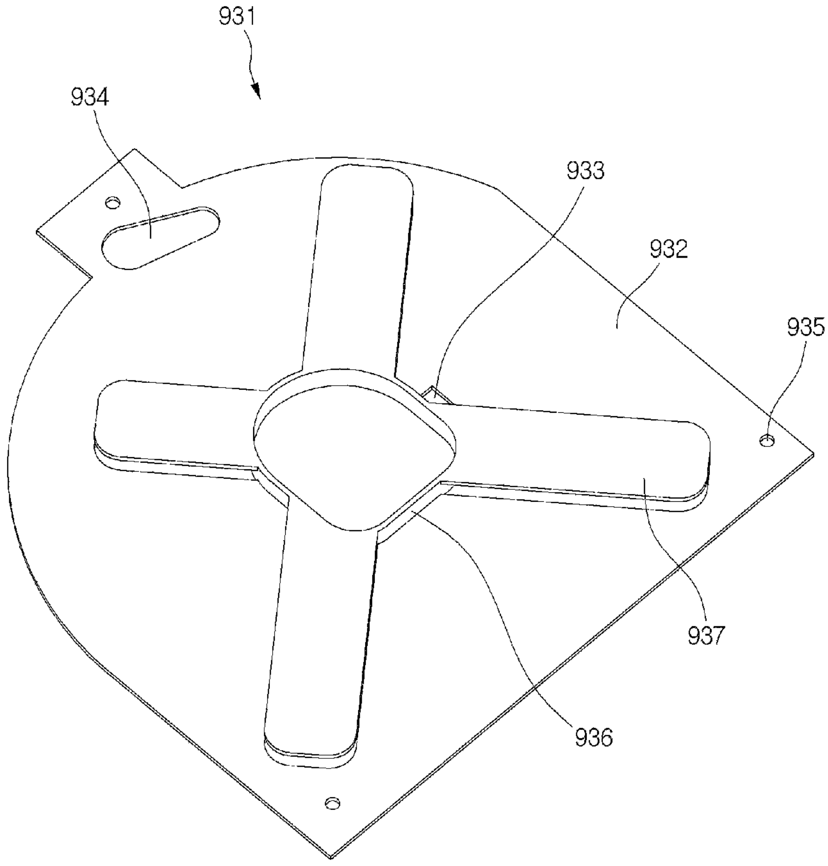
FIG. 14 is a perspective view of a tube support of the tube tank assembly of FIG. 13.
Figure 15:
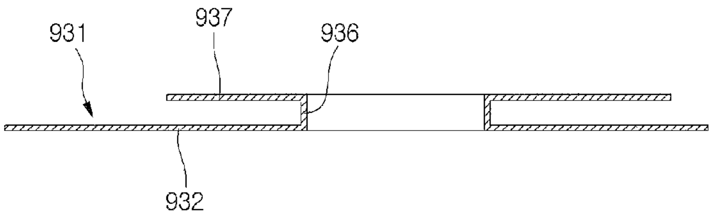
FIG. 15 is a cross-sectional view of the tube support of the tube tank assembly of FIG. 13.

FIG. 13 illustrates a tube tank assembly according to the second implementation, FIG. 14 illustrates a tube support constituting the tube tank assembly of FIG. 13, and FIG. 15 illustrates a cross-sectional view of the tube support constituting the tube tank assembly of FIG. 13.

Referring to FIGS. 13 to 15, the tube tank assembly 930 may include a tube defining the door cold water passage 940 and a tube support 931 around which the tube is wound. The tube support 931 may include a first plate 932, an extension part 936 extending from the first plate 932, and at least one second plate 937 extending from extension part 936 in a direction parallel to the first plate 932.

The first and second plates 932 and 937 are spaced apart from each other by the extension part 936, and the tube may be wound several times around the extension part 936. Here, the tube of the tube support 931 may be wound in a circular line shape (one layer) so that the cold water within the tube has a uniform temperature. To wind the tube around the extension part 936 in a line, a distance between the first and second plates 932 and 937 may be equal to or larger than an outer diameter of the tube and less than one and a half times of the outer diameter of the tube.

The first plate 932 has at least one coupling hole 935 coupled to a dispenser housing defining the dispenser 87 by using a coupling member such as a screw. In some cases, a coupling boss to which the coupling member is coupled may be disposed on the dispenser housing. For another example, the first plate 932 may be coupled to a cover (see reference numeral 816 of FIG. 11) for covering the accommodation part 815 of the refrigerating compartment door 81.

An insertion part 933 in which the tube is inserted and a withdrawal part 934 through which the tube wound around the extension part 936 passes may be disposed in the first plate 932.

The second plate 937 may prevent the tube wound around the extension part 936 from being separated from the extension part 936. To effectively prevent the tube from being separated, a plurality of second plates 937 may extend from the extension part 936. The plurality of second plates 937 may be disposed to be spaced a predetermined distance from each other.

As illustrated in the current implementation, since the first plate 932 supports the tube, and the second plates 937 prevent the separation of the tube wound around the extension part 936, the first plate 932 may be called a support plate, and the second plate 937 may be called a separation prevention part. The second plate 937 may contact the cover (see reference numeral 816 of FIG. 11).

In case of the current implementation, since the tube tank assembly 930 is disposed in the refrigerating compartment door 81, the freezing of the cold water within the tube may be prevented. Also, to maintain the water within the tube in a low-temperature state, the second plate 937 may contact the cover (see reference numeral 816 of FIG. 11).

Also, according to the current implementation, since the tube tank assembly 930 is disposed in the refrigerating compartment door 81, a heater for preventing the freezing from occurring may be unnecessary.

Thus, in the current implementation, when the cold water is initially dispensed, an amount of discharged cold water may increase.

Figure 16:
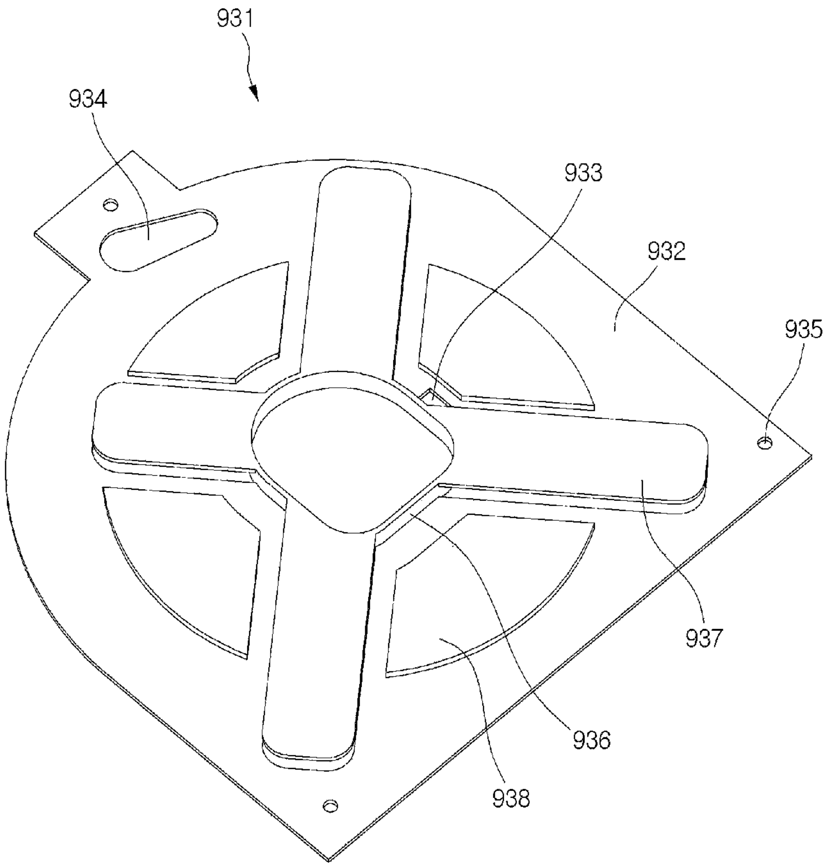
FIG. 16 is a perspective view of an example tube support according to a third implementation.

FIG. 16 illustrates a tube support according to a third implementation. The current implementation is similar to the second implementation except for a first plate of a tube support, as further described below.

Referring to FIG. 16, a tube support 931 according to the current implementation may further include a pressing part 938 for pressing a tube of the tube tank assembly 930. The pressing part 938 is disposed in an area corresponding to that between two second plates 937 adjacent to the first plate 932. Thus, the pressing part 938 may be disposed without overlapping the second plate 937. Also, the pressing part 938 may protrude from a surface on which an extension part 369 of the first plate 932 is disposed.

Accordingly, the pressing part 938 may press the tube in a state where the tube is wound around the extension part 936. Thus, a portion of the tube may be disposed between the two second plates 937 adjacent to each other. Also, the portion of the tube disposed between the two second plates 937 may contact a cover (see reference numeral 816 of FIG. 11).

Thus, according to the current implementation, since the portion of the tube contacts the cover (see reference numeral 816 of FIG. 11), cold water within the tube may be maintained in a low-temperature state.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
a main body having a refrigerating compartment and a freezing compartment;
a door configured to open or close at least a portion of the refrigerating compartment or the freezing compartment;
a dispenser disposed in the door to dispense cooled water and purified water;
a filter unit disposed within the refrigerating compartment and configured to purify water supplied from a water supply source outside the main body;
a water tank configured to store water from the filter unit and to cool the stored water by using cool air within the refrigerating compartment;
a tube tank assembly disposed in the door and configured to store the cooled water cooled in the water tank,
wherein the tube tank assembly comprises:
a tube defining a cold water passage that is configured to allow the cooled water cooled in the water tank to flow therethrough, and
a tube support having a thickness that is greater than a diameter of the tube and less than one and a half times of the diameter of the tube so that the tube is wound multiple times in one layer therearound, and
wherein the tube is wound circularly around the tube support, and the tube support is configured to maintain a circular shape of the tube,
wherein the tube support comprises:
a support plate configured to support the tube,
an extension part around which the tube is wound, the extension part extending from the support plate, and
a separation prevention part configured to prevent the tube wound around the extension part from being separated from the extension part,
wherein the support plate defines an insertion part that allows the tube to be wound around the extension part by passing through the insertion part, and defines a withdrawal part through which the tube that is wound around the extension part passes, and
wherein the insertion part is disposed adjacent to the extension part, and a distance between the extension part and the withdrawal part is greater than a distance between the extension part and the insertion part.

2. The refrigerator according to claim 1,
wherein the thickness of the tube support is equal to a length of the extension part.

3. The refrigerator according to claim 2, wherein a distance between the support plate and the separation prevention part is equal to or larger than an outer diameter of the tube and less than two times of the outer diameter of the tube thereby allowing the tube to be wound around the extension part in one layer.

4. The refrigerator according to claim 2, wherein the separation prevention part extends from the extension part in a direction parallel to the support plate.

5. The refrigerator according to claim 2, wherein
the door is a freezing compartment door configured to open or close the freezing compartment,
a temperature sensor is disposed on the separation prevention part, and
a heater configured to heat the tube is disposed on the support plate.

6. The refrigerator according to claim 5, wherein a heat conductive member is disposed between the separation prevention part and the tube.

7. The refrigerator according to claim 2, wherein
the door is a freezing compartment door,
the dispenser comprises a dispenser housing, and
a coupling part coupled to the dispenser housing is disposed on the support plate.

8. The refrigerator according to claim 7, wherein
the door comprises an outer case and a door liner connected to the outer case, and
in a state in which the coupling part is coupled to the dispenser housing, the support plate is spaced apart from the dispenser housing, and the separation prevention part is spaced apart from a back surface of the door liner.

9. The refrigerator according to claim 8, wherein all or a portion of the tube is disposed between the back surface of the door liner and a first reference line that bisects a distance between the dispenser housing the back surface of the door liner.

10. The refrigerator according to claim 9, wherein all or a portion of the tube is disposed between the first reference line and a second reference line that bisects a distance between the first reference line and the back surface of the door liner.

11. The refrigerator according to claim 2, wherein the door is a refrigerating compartment door configured to open or close at least a portion of the refrigerating compartment, the refrigerating compartment door comprising:
an outer case;
a door liner connected to the outer case, the door liner having an accommodation part accommodating the tube tank assembly; and
a cover configured to cover the accommodation part.

12. The refrigerator according to claim 11, wherein the separation prevention part contacts the cover.

13. The refrigerator according to claim 11, wherein the separation prevention part includes a plurality of separation prevention parts that extend from the extension part and are spaced apart from each other, and wherein a pressing part that is configured to press the tube wound around the extension part toward the cover is disposed on the support plate, the pressing part being disposed at a location corresponding to an area between two adjacent separation prevention parts.

14. The refrigerator according to claim 2, wherein the separation prevention part is a wire that is configured to wind around the tube wound around the extension part and the support plate.

15. The refrigerator according to claim 1, wherein the dispenser comprises a dispenser housing,
the tube tank assembly further comprises a heater for heating the tube by using heat,
the tube support is disposed on the dispenser housing, and
the heater is disposed between the dispenser housing and the tube.

16. The refrigerator according to claim 15, wherein the tube tank assembly further comprises a temperature sensor disposed on the tube support, and
the temperature sensor detects a temperature of the outermost portion of the tube wound around the tube support.

17. A refrigerator comprising:
a cabinet in which a refrigerating compartment and a freezing compartment are defined;

a refrigerating compartment door to open or close the refrigerating compartment;

a freezing compartment door to open or close the freezing compartment;

an ice maker disposed at the refrigerating compartment door or the freezing compartment door, the ice maker being configured to make cubes;

a water supply passage connected to a water supply source outside the cabinet;

a water supply valve to open or close the water supply passage;

a plurality of filters vertically arranged in the refrigerating compartment;

a water tank disposed in the refrigerating compartment;

a first cold water passage branched at a rear end of the plurality of filters, the first cold water passage being connected to a flow adjustment valve via the water tank;

a common passage connected to the flow adjustment valve at a rear end of the first cold water passage to pass through an upper door hinge of the refrigerating compartment door;

a first purified water passage branched at a rear end of the plurality of filters, the first purified water passage being connected to the common passage;

a second cold water passage connected to the common passage;

a cold water adjustment valve mounted on the refrigerating compartment door and configured to control a flow of cold water in the second cold water passage;

a second purified water passage connected to the common passage;

a purified water adjustment valve mounted on the refrigerating compartment door and configured to control a flow of the purified water in the second purified water passage; and an ice making passage connected to the purified water adjustment valve to supply the purified water to the ice maker, wherein the first cold water passage and first purified water passage are provided within the cabinet, and wherein the second cold water passage and the second purified water passage are provided within the refrigerating compartment door.

18. The refrigerator according to claim 17, further comprising an auxiliary water tank disposed in the refrigerating compartment door and connected to the second cold water passage to store the cold water.

19. The refrigerator according to claim 17, wherein the auxiliary water tank comprises:

a tube through which the cold water flows; and a tube support having a thickness that is greater than a diameter of the tube and less than one and a half times of the diameter of the tube so that the tube is wound multiple times in one layer therearound.

20. The refrigerator according to claim 19, wherein the tube support comprises:

a support plate supporting the tube;

an extension part around which the tube is wound, the extension part extending from the support plate; and a separation prevention part preventing the tube wound around the extension part from being separated from the extension part, and wherein the thickness of the tube support is equal to a length of the extension part.

21. The refrigerator according to claim 20, wherein the support plate comprises an insertion part through which the tube passes to be wound around the extension part and a withdrawal part through which the tube wound around the extension part passes.

22. The refrigerator according to claim 18, wherein the refrigerating compartment door comprises:

an accommodation part in which the auxiliary water tank is accommodated; and a cover covering the accommodation part, wherein the auxiliary water tank is coupled to the cover.

23. The refrigerator according to claim 17, wherein the water tank is disposed to cross the extension direction of the plurality of filters.

24. The refrigerator according to claim 1, wherein the insertion part is disposed between the extension part and the withdrawal part at a location closer to the extension part than to the withdrawal part.

* * * * *